J. DAIN & J. MACPHAIL.
HORSE RAKE.
APPLICATION FILED JUNE 9, 1913.
1,225,112.
Patented May 8, 1917.
3 SHEETS—SHEET 1.
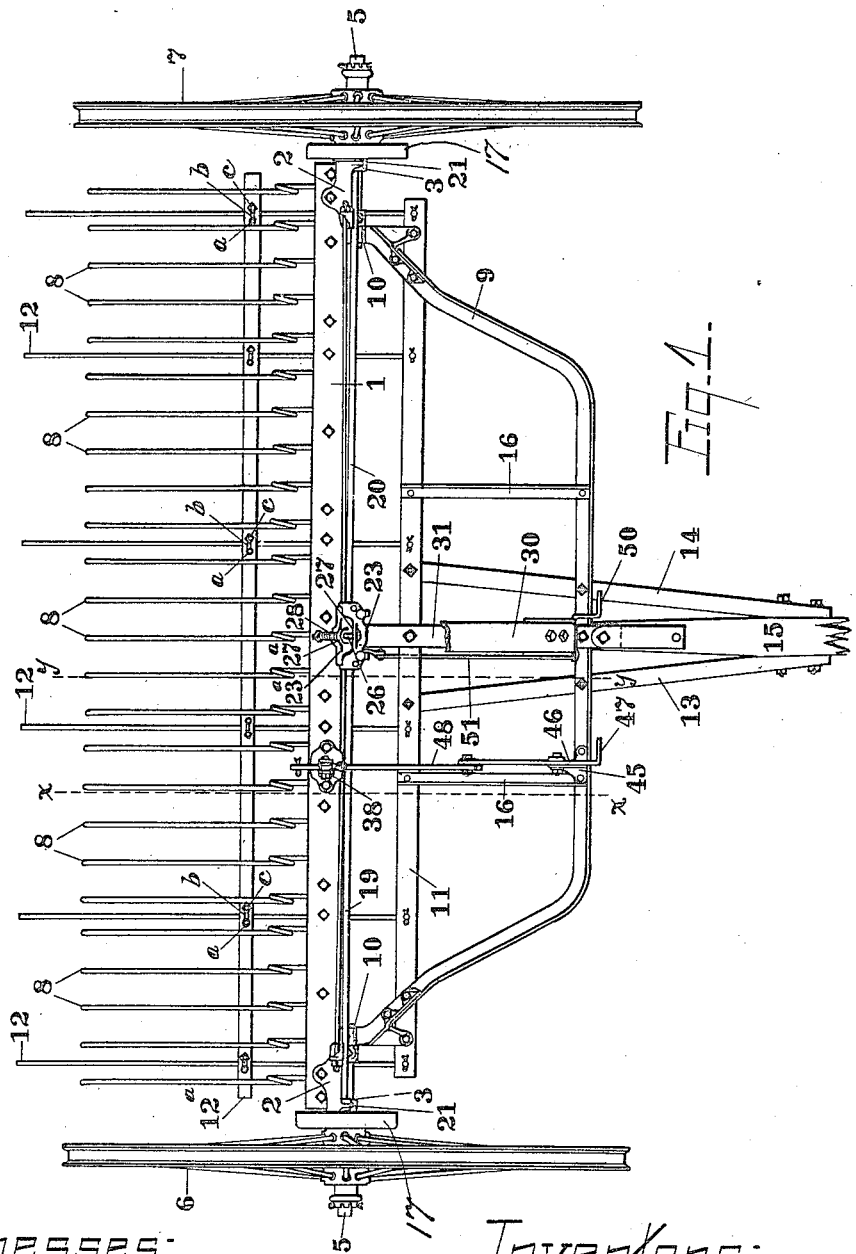

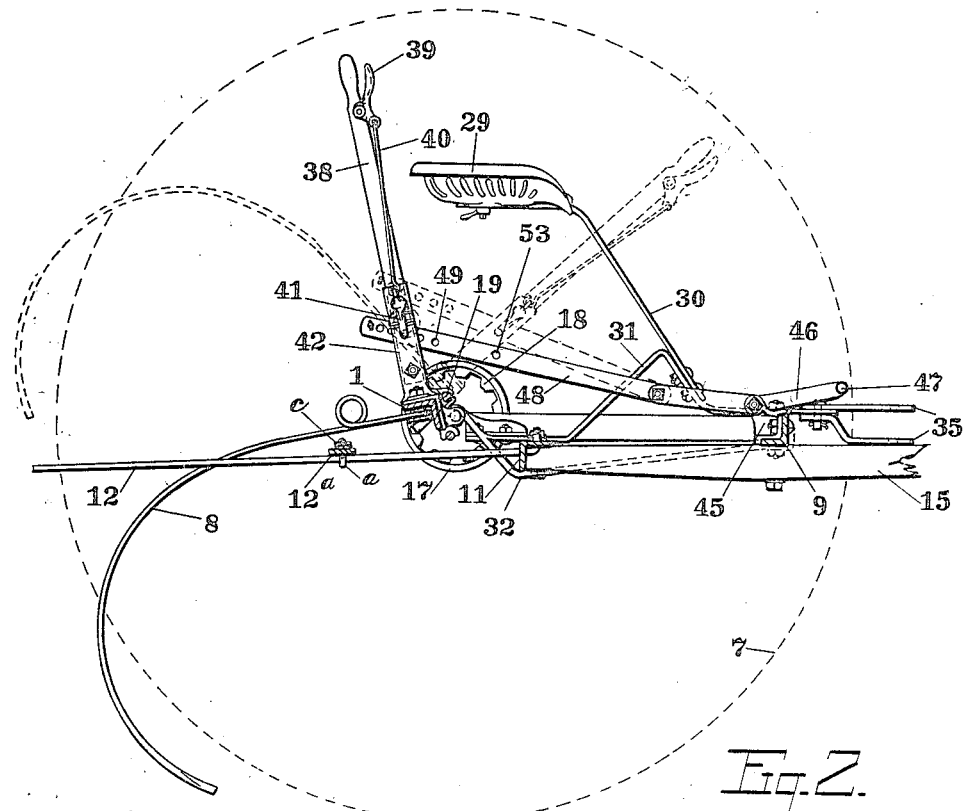
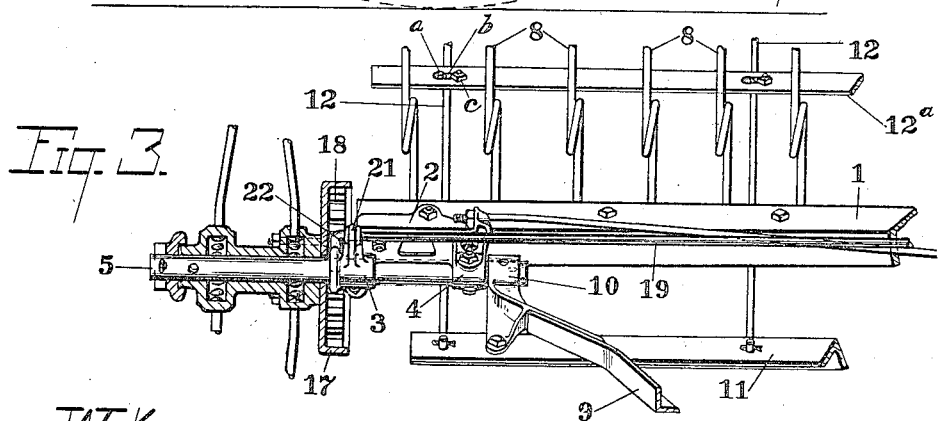

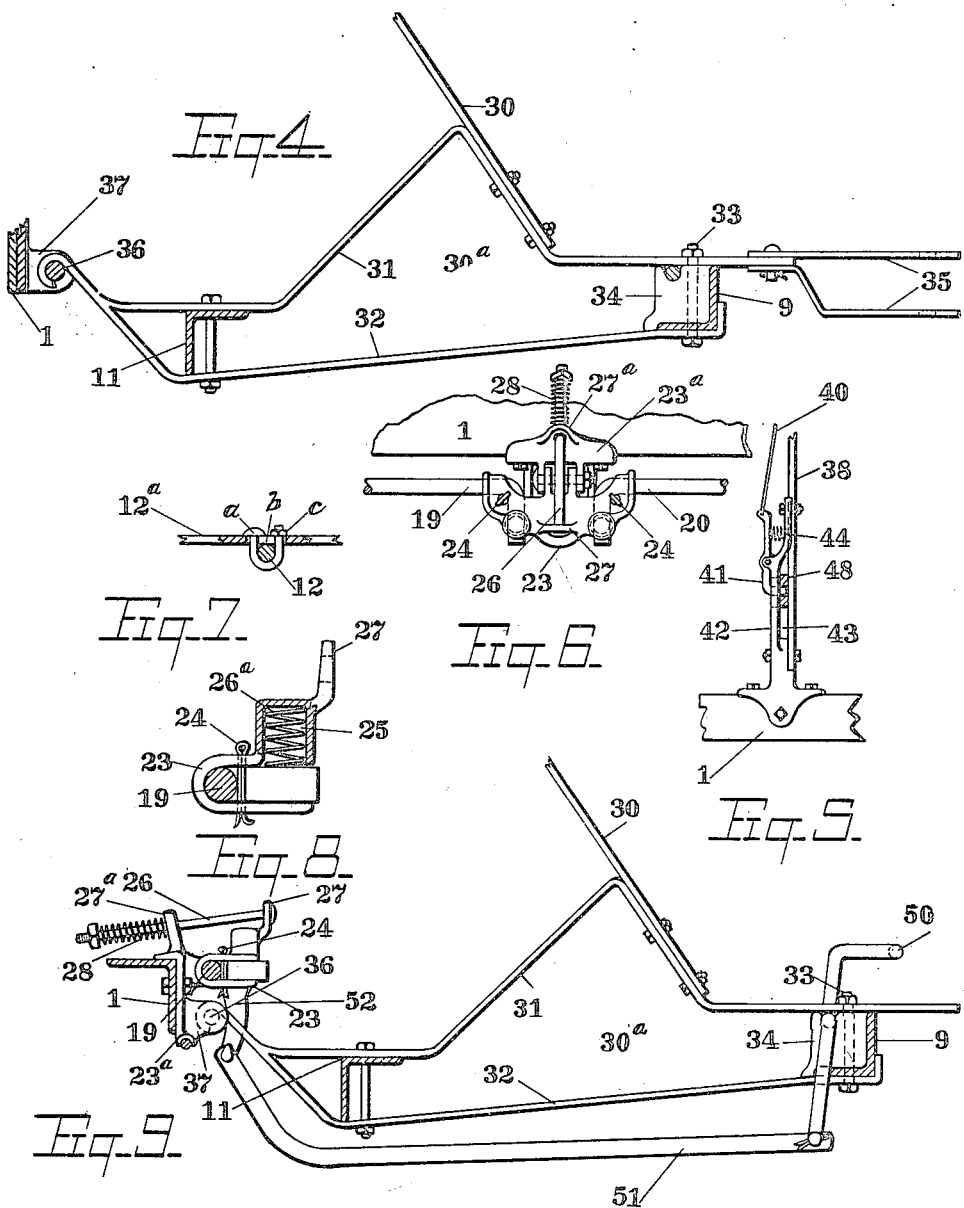

UNITED STATES PATENT OFFICE.

JOSEPH DAIN, OF MOLINE, ILLINOIS, AND JAMES MACPHAIL, OF DAVENPORT, IOWA, ASSIGNORS, BY MESNE ASSIGNMENTS, TO DEERE & COMPANY, OF MOLINE, ILLINOIS, A CORPORATION OF ILLINOIS.

HORSE-RAKE.

1,225,112.　　　　Specification of Letters Patent.　　Patented May 8, 1917.

Application filed June 9, 1913. Serial No. 772,569.

*To all whom it may concern:*

Be it known that we, JOSEPH DAIN and JAMES MACPHAIL, citizens of the United States, residing, respectively, at Moline, in the county of Rock Island and State of Illinois, and at Davenport, in the county of Scott and State of Iowa, have invented certain new and useful Improvements in Horse-Rakes, of which the following is a specification, reference being had therein to the accompanying drawing.

This invention relates to horse hay rakes, having reference more particularly to what are commonly known as self-dumping rakes, which comprise a rake head carrying spring gathering teeth and mounted on a wheeled axle combined with means connecting the rake head and the wheels so that the power of the latter may be utilized to rock the rake head, either automatically or at will, to raise the gathering teeth from the ground by rocking the rake head upwardly a predetermined distance, and allowing it to drop when the limit of its rocking movement has been reached. Our invention has for its object improvement in various parts of the machine, and its operation as will be clearly described and claimed hereinafter.

Referring to the drawings in which similar numerals indicate identical parts—

Figure 1 is a plan view of a dump rake embodying our improvements. Fig. 2 is a side elevation in section on the line *x* of Fig. 1. Fig. 3 is a detail in part section. Fig. 4 is a detail of the seat-support.

Fig. 5 is a detail of the adjusting lever, and connected parts.

Fig. 6 is a detail of the inner ends of the dump rods and the support therefor.

Fig. 7 is a detail showing the manner of securing the stripper arms to the spacing bar.

Fig. 8 is a detail section of Fig. 6 showing the bent end of a dump rod and its mounting, and Fig. 9 is a detail section across the rake head showing connected parts of the dumping mechanism and the seat support.

A rake head 1 consisting of a bar of angle iron or steel has secured to each end castings 2 with forwardly projecting lugs 3 and 4 having transverse openings to form bearings for stub-axles 5 on the outer end of which the wheels 6 and 7 are mounted; the stub-axles being held rigidly in their bearings in the lugs 3 and 4 of the castings 2, and move only with the rake-head 1 when the latter is rocked. Curved spring teeth 8 are secured to the rake head in a suitable manner. A bow-shaped frame 9 extends forwardly of the rake-head 1 and has bearings 10 on each end thereof which are secured on the inner ends of the stub-axles 5.

A stripper-bar 11, angular in cross-section, is secured to the under side of the frame 9 and carries stripper-arms 12 which project rearwardly between the rake-teeth 8 and are spaced apart by a bar $12^a$, the latter being of flat steel preferably. The stripper-arms 12 have their forward ends bent to pass through openings in the vertical and horizontal sides of the angular stripper-bar 11, and are secured thereon preferably by cotters as shown; the stripper-arms 12 pass beneath the bar $12^a$ and are secured to the latter by headed bolts *a* bent to a U shape and projected through slots *b*, the heads of the bolts *a* engaging with the surface of the bar $12^a$ so that the bolts *a* form loops through which the stripper arms pass and are tightly held by nuts *c* on the threaded ends of the bolts *a* and on the upper side of the bar $12^a$.

Braces 16 are connected to the frame 9 and the stripper-bar 11.

The wheels 6 and 7 are provided at the inner end of their hubs with annular flanges 17 having internal teeth 18, said flanges 17 being secured to the hubs of the wheels 6 and 7 in any suitable manner or formed integral therewith. Extending in opposite directions from the center of the axle and lengthwise therewith are two rock-shafts 19 and 20 which are rockably supported at their outer ends in lugs 21 forming part of the lugs 3 on the castings 2. The outer ends of the rock-shafts 19 and 20 are bent preferably at right angles to form dogs or pawls 22 which project within the annular flanges 17 and are adapted to engage with the teeth 18. The inner ends of the two rock-shafts 19 and 20 are bent at right angles and held in recesses on opposite sides of a casting 23 by cotters 24 as shown more clearly in Figs. 6 and 8. Forwardly in the casting 23 are sockets 25 in which are coiled springs $26^a$ exerting their pressure upon the inner ends of the rock-shafts 19 and 20.

The casting 23 forms part of a hinge the second part 23ᵃ of which is secured to the rake-head 1 as better illustrated in Figs. 6 and 9. To retain the casting 23 in its normal position I employ a short rod or pin 26 loosely connected to a lug 27 on the casting 23 and also a lug 27ᵃ. A coiled spring 28 encircles said pin 26 rearward of a lug 27ᵃ against which it bears, and is held on the pin 26 by a nut.

A seat 29 is mounted on a support 30 which is bolted to a structure 30ᵃ having its parts formed preferably integral and having an upper member 31 and a lower member 32 converging and joined at their rear ends. The lower member 32 is secured forwardly to the frame 9 by a bolt 33 which passes through said member and through a casting 34 and the forward end of the upper member 31, a nut on the end of said bolt holding these parts rigidly together. The lower member 32 extends rearwardly and is secured to the stripper-bar 11 by a bolt which passes through the latter and the rearward extension of the upper member 31; the forward portion of the upper member 31 is substantially horizontal and extends forwardly of the frame 9, to this extension is attached a clevis 35 for a double-tree or other draft means. Rearward of its attachment to the frame 9 the upper member 31 forms an angle to the forward side of which the seat support 30 is rigidly secured. The rearward portion of the upper member 31 is substantially horizontal and extends rearward of the stripper-bar 9 where it merges with the upwardly and rearwardly inclined portion of the latter, the end of which is bent to form a hook adapted to pivotally engage with a pin 36 between lugs 37 on the casting 23ᵃ.

A hand-lever 38 is rigidly mounted on the rake-head 1 and is provided with a grip operated member 39 pivoted to rock thereon, a rod 40 connects said grip with a rockable dog 41 pivotally mounted on a casting 42 which forms part of the lever 38; the lower end of the dog 41 is bent at a right angle and operates through an aperture in the casting 42 into a space 43 between said casting and part of the lever 38, the space 43 forming a guideway for the link 48; a spring 44 is fixed between said lever and the dog 41 to retain the latter in a locking position. Pivotally mounted between its ends on a casting 45 on the frame 9 is a foot lever 46, having its forward end bent at a right angle to form a foot rest 47 which normally rests in contact with the frame 9; rearwardly of its pivot the foot lever 46 is pivotally connected to a link 48 the rear end of which extends through the space 43 and is provided with a series of holes 49 with which the dog 41 is adapted to engage.

A foot lever 50 is rockably supported on the casting 34 and has a link 51 which is connected to the lower end of said foot lever 50 and to a downwardly projecting lug 52 on the casting 23.

In the operation of our improved rake, the teeth 8 are preferably as shown in Fig. 2 with their points clear of the ground to avoid contact therewith and to prevent stirring of dust, the height of the teeth above the ground being regulated by moving the lever 38 to cause the dog 41 to engage with any one of the holes 49 in the link 48, an operation which can readily be effected while the rake is in motion or at a standstill. By freeing the dog 41 the lever can also be operated to rock the rake-head 1 and raise the teeth to their greatest limit for purposes of transportation, and held in such position by the dog 41 engaging with a hole 53 in the link 48. It will be noted that the foot-lever 46 and the link 48 are slightly out of line with each other in order that their pivotal joint will break readily, and at the same time their angular relation is not sufficiently great to require but little more than ordinary foot pressure on the foot-lever to prevent the rake-teeth 8 lifting under pressure of the accumulating hay.

To dump the hay automatically the foot lever 50 is operated and the casting 23 rocked downwardly through the interconnecting link 51, the dump rods 19 and 20 are thus rocked at the same time and the dogs 22 are moved into engagement with the teeth 18 in the annular flanges 17, the revolution of the wheels 6 and 7 will then rock the rake-head 1, and the attached teeth 8, on the stub-axles 5 until a stop on the casting 23 contacts with the member 31 checking the downward movement of the casting 23 and thereby disengaging the dogs 22 from the teeth 18, the rake-head 1 then rocks to bring the rake-teeth 8 again into position for raking, the pressure of the spring 28 lifting the casting 23 and consequently moving the foot lever 50 into its normal position ready for use.

The dump-rods 19 and 20 are reversible and interchangeable, and either can be removed from the rake without disturbing the other an operation easy of accomplishment by removing either wheel and one of the cotters 24 on that side of the rake when the dump-rod held thereby can be readily withdrawn from the casting 23 and the lug 21 leaving the remaining dump-rod securely in place and in an operable position.

We claim—

1. In a horse rake, the combination of a rocking rake-head, stub axles at each end thereof, wheels journaled on said axles and having internally toothed hubs, two reversible dump rods in line with each other and substantially parallel with the rake head and having like outer right angular ends adapted to engage the internally toothed hubs, a casting hinged centrally to the rake-head and having oppositely disposed recesses, like inner right angular ends on the dump rods to engage with said recesses, means to retain said dump rods in said recesses independently of each other, either one of said dump rods being removable without affecting the operation of the other dump rod.

2. In a horse rake, the combination of a rocking rake-head, supporting wheels journaled on stub axles on the rake-head and having internally toothed hubs, two reversible dump rods substantially parallel with the rake-head and having like right angular ends, a casting pivoted centrally on the rake-head and having oppositely disposed recesses, the outer right angular ends of the dump rods adapted to engage with the internal teeth of the wheel hubs, each of the inner right angular ends of the dump rods held in the recesses of said casting by a pin, said pins being removable to withdraw either of said dump rods without affecting the operation of the remaining dump rod.

In testimony whereof we affix our signatures, in presence of two witnesses.

JOSEPH DAIN.
JAMES MACPHAIL.

Witnesses:
BERTHA A. MAURER,
W. G. DUFFIELD.

Copies of this patent may be obtained for five cents each, by addressing the "Commissioner of Patents, Washington, D. C."